United States Patent
Kondo

(10) Patent No.: US 7,167,455 B2
(45) Date of Patent: Jan. 23, 2007

(54) RAKE COMBINING CIRCUIT AND RAKE COMBINING METHOD

(75) Inventor: Hisashi Kondo, Chiba (JP)

(73) Assignee: Kawasaki Microelectronics, Inc., Chiba (JP)

(*) Notice: Subject to any disclaimer, the term of this patent is extended or adjusted under 35 U.S.C. 154(b) by 1032 days.

(21) Appl. No.: 10/240,115

(22) PCT Filed: Dec. 20, 2001

(86) PCT No.: PCT/JP01/11188

§ 371 (c)(1),
(2), (4) Date: Sep. 27, 2002

(87) PCT Pub. No.: WO02/054615

PCT Pub. Date: Jul. 11, 2002

(65) Prior Publication Data

US 2003/0117970 A1 Jun. 26, 2003

(30) Foreign Application Priority Data

Dec. 28, 2000 (JP) ............... 2000-401202

(51) Int. Cl.
*H04B 7/216* (2006.01)
*H04Q 7/28* (2006.01)
*H04B 7/208* (2006.01)
*H04B 1/00* (2006.01)

(52) U.S. Cl. .............. 370/320; 370/342; 370/341; 375/150

(58) Field of Classification Search ........ 370/320, 370/342, 441, 335, 206–208; 375/152, 130, 375/150, 145, 240; 455/63.1
See application file for complete search history.

(56) References Cited

U.S. PATENT DOCUMENTS

| | | | | |
|---|---|---|---|---|
| 5,694,388 A | * | 12/1997 | Sawahashi et al. | 370/206 |
| 6,154,487 A | * | 11/2000 | Murai et al. | 375/150 |
| 6,680,928 B1 | * | 1/2004 | Dent | 370/342 |
| 6,879,576 B1 | * | 4/2005 | Agrawal et al. | 370/342 |

FOREIGN PATENT DOCUMENTS

| | | |
|---|---|---|
| JP | A 8-84096 | 3/1996 |
| JP | A 10-51424 | 2/1998 |
| JP | A 10-233713 | 9/1998 |
| JP | A 11-8606 | 1/1999 |
| JP | A 11-46158 | 2/1999 |

* cited by examiner

*Primary Examiner*—Chi Pham
*Assistant Examiner*—Prenell Jones
(74) *Attorney, Agent, or Firm*—Oliff & Berridge, PLC

(57) ABSTRACT

Not only an instantaneous pilot symbol value resulting from correcting a phase of one demodulated pilot symbol in response to phase deviation of the one pilot symbol but also a pilot symbol value resulting from correcting a phase of the same pilot symbol corresponding to the instantaneous pilot symbol value in response to averaged phase deviation of a plurality of demodulated receive pilot symbols is calculated. Further, weight factors are generated on the basis of a difference between the instantaneous pilot symbol value and the pilot symbol value, and the respective demodulated receive data is weighted by using the weight factors to combine the receive data.

12 Claims, 4 Drawing Sheets

RAKE COMBINING CIRCUIT AND RAKE COMBINING METHOD

TECHNICAL FIELD

The present invention relates to a RAKE combining circuit for use in a mobile communication system utilizing a spread spectrum system and to a RAKE combining method.

BACKGROUND ART

In a mobile communication system that utilizes a spread spectrum system, there has been used a technique called a RAKE receiving system for improving communication quality. In this receiving system, a plurality of data received via different communication paths are demodulated in circuits called fingers and these demodulated data are combined. In the RAKE receiving system, a weight is added to each of output signals from the fingers in some way when the demodulated data are combined. Generally, the weighting is often carried out on the basis of power of the receive data.

FIG. 6 shows an example of a schematic diagram of a conventional RAKE combining circuit.

The RAKE combining circuit 50 shown in FIG. 6 has three fingers (Finger 0, Finger 1 and Finger 2) 52a, 52b and 52c for demodulating receive data, three multipliers 54a, 54b and 54c corresponding to the three fingers 52a, 52b and 52c, and an adder 56 for adding up output signals from these three multipliers 54a, 54b and 54c.

In the illustrated RAKE combining circuit 50, the receive data of respective paths are demodulated by the respective fingers 52a, 52b and 52c. As described above, the demodulated receive data S0, S1 and S2 of the respective paths are multiplied by weight factors W0, W1 and W2 generated on the basis of the power of the receive data by the corresponding multipliers 54a, 54b and 54c so as to give a weight to the demodulated receive data. Then the weighted data are added up and combined by the adder 56 before being outputted as a signal SYMOUT.

However, since a random noise component, an interfering component and the like may be contained in the receive data in a case that the respective demodulated receive data are given the weight on the basis of the power of the receive data, the receive data are not always combined accurately at an expected signal component ratio. Moreover, phases of the receive data itself may be also rotated under an influence of fading or the like. Generally, the phase shift of the receive data is estimated by using a pilot symbol whereby to perform a process of correcting the receive data. However, there is a possibility that the estimated value itself may have errors then.

DISCLOSURE OF THE INVENTION

An object of the invention is to solve the problems based on the prior art as described above and to provide a RAKE combining circuit and a RAKE combining method capable of giving a weight to the receive data of the respective paths in consideration of a phase error, receiving level deterioration and so forth.

In order to accomplish the object above, the invention provides a RAKE combining circuit comprising:

at least two fingers that are circuits for demodulating pilot symbols as well as receive data and outputting not only an instantaneous pilot symbol value resulting from correcting a phase of one demodulated pilot symbol itself in response to phase deviation of the one demodulated pilot symbol but also a pilot symbol value resulting from correcting a phase of the same pilot symbol corresponding to the instantaneous pilot symbol value in response to averaged phase deviation of a plurality of demodulated pilot symbols, a weight factor generation circuit for generating weight factors corresponding to demodulated receive data outputted from the respective fingers on the basis of a difference between the instantaneous pilot symbol value and the pilot symbol value, and a combiner for weighting and combining the demodulated receive data outputted from the respective fingers by using the weight factors outputted from the weight factor generating circuit.

In the RAKE combining circuit above, the difference is preferably equivalent to a distance of a straight line or the Manhattan distance, both are distances between the instantaneous pilot symbol value and the pilot symbol value, or a distance calculated by a function with the instantaneous pilot symbol value and the pilot symbol value.

Preferably, the weight factor generation circuit generates the weight factor according to the difference by using the functional equations or LUTs.

Preferably, the weight factor is an inverse ratio of the difference.

Preferably, each finger comprises:

a first de-spread circuit for de-spreading the receive data to demodulate the receive data;

a second de-spread circuit for de-spreading the pilot symbol to demodulate the pilot symbol;

a phase calculation circuit for performing phase calculation of the demodulated pilot symbol;

an averaging circuit for averaging the results of phase calculation of the plurality of pilot symbols;

a delay circuit for delaying the demodulated pilot symbol to adjust timing according to the averaged result of phase calculation while the averaging circuit averages the results of phase calculation of the plurality of the pilot symbols;

a first multiplier for multiplying the demodulated pilot symbol by the result of phase calculation of the pilot symbol to calculate the instantaneous pilot symbol value of the demodulated pilot symbol;

a second multiplier for multiplying a delay signal outputted from the delay circuit by the averaged result of phase calculation to calculate the pilot symbol value of the delay output signal;

and a third multiplier for multiplying the demodulated receive data by the averaged result of phase calculation to calculate the receive data subjected to phase correction.

The invention provides a RAKE combining method comprising the steps of:

calculating an instantaneous pilot symbol value resulting from correcting a phase of one demodulated pilot symbol in response to phase deviation of the one demodulated pilot symbol and a pilot symbol value resulting from correcting a phase of the same pilot symbol corresponding to the instantaneous pilot symbol value in response to averaged phase deviation of a plurality of demodulated pilot symbols;

generating a weight factor corresponding to each demodulated receive data on the basis of a difference between the instantaneous pilot symbol value and the pilot symbol value; and weighting the respective demodulated receive data to combine the respective data by using the weight factors.

In the RAKE combining method, the difference is preferably equivalent to a distance of a straight line or the Manhattan distance, both are distances between the instantaneous pilot symbol value and the pilot symbol value, or a distance calculated by a function with the instantaneous pilot symbol value and the pilot value.

Preferably, the weight factor is generated according to the difference by using functional equations or LUTs.

Preferably, the weight factor is an inverse ratio of the difference.

Preferably, the instantaneous pilot symbol value is calculated through the steps of performing phase calculation of the demodulated pilot symbol and multiplying the demodulated pilot symbol by the result of phase calculation.

Preferably, the pilot symbol value is calculated by multiplying the demodulated pilot symbol which is delayed for time averaging the results of phase calculation of the plurality of pilot symbols by the averaged result of phase calculation.

Preferably, the phase of the demodulated receive data is corrected by multiplying the demodulated receive data by the averaged result of phase calculation.

BEST MODE FOR CARRYING OUT THE INVENTION

A detailed description will now be given of a RAKE combining circuit and a RAKE combining method of the invention based on the preferred embodiment shown in the accompanying drawings.

Figure 1:
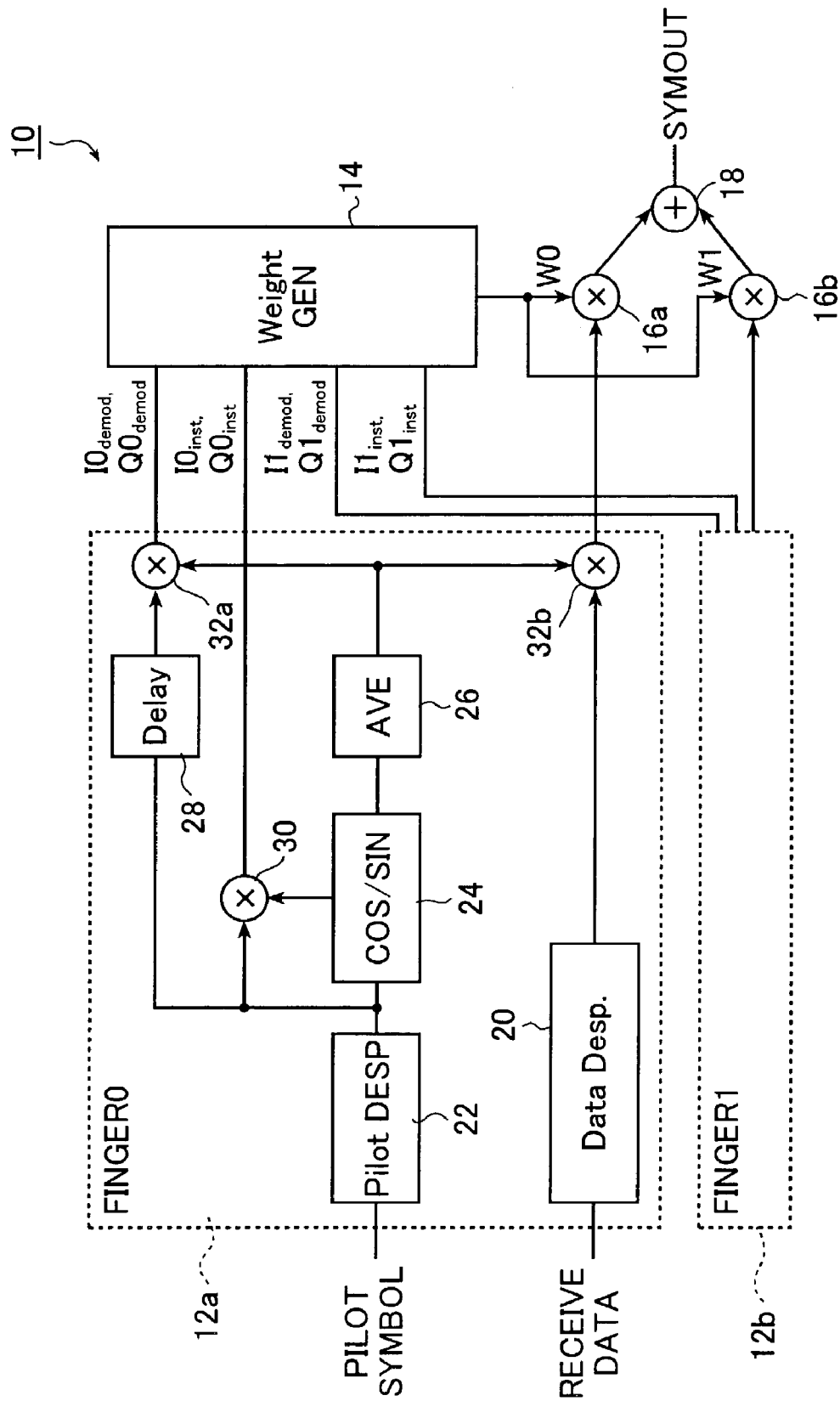
FIG. 1 is a schematic diagram of one embodiment of a RAKE combining circuit of the invention to which a RAKE combining method of the invention is applied.

FIG. 1 is a schematic diagram of one embodiment of a RAKE combining circuit of the invention to which a RAKE combining method of the invention is applied.

The RAKE combining circuit 10 shown in FIG. 1 gives a weight to two receive data to combine based on pilot symbols. The RAKE combining circuit 10 has two fingers (FINGER 0 and FINGER 1) 12a and 12b, a weight factor generation circuit (Weight GEN) 14, two multipliers 16a and 16b arranged corresponding to the fingers 12a and 12b, and an adder 18.

In the RAKE combining circuit 10 shown in FIG. 1, according to a RAKE combining method of the invention, a plurality of kinds of pilot symbols which have a known bit pattern and a known phase together with data series as communication information are received and a deviation between the known phase of the pilot symbol and a phase of the pilot symbol actually received is calculated. Further, the RAKE combining circuit 10 gives a weight to each of the output signals from the fingers 12a and 12b on the basis of the difference between an instantaneous pilot symbol value (equal in value to the power of the pilot symbol) and a pilot symbol value corresponding to the instantaneous pilot symbol value.

Here, the instantaneous pilot symbol value in this case results from estimating a channel with one demodulated pilot symbol and correcting the phase of this pilot symbol itself in accordance with the phase deviation. Moreover, the pilot symbol value results from estimating a channel by using a plurality of demodulated pilot symbols and correcting the phase of the same pilot symbol corresponding to the instantaneous pilot symbol value according to the averaged phase deviation of the plurality of the pilot symbols.

In the RAKE combining circuit 10 shown in FIG. 1, the fingers 12a and 12b are demodulators of the pilot symbol and the receive data. As typified by the finger (FINGER 0) 12a, it has a receive data de-spread circuit (Data Desp) 20, a pilot symbol de-spread circuit (Pilot Desp) 22, a phase calculation circuit (COS/SIN) 24, an averaging circuit (AVE) 26, a delay circuit (Delay) 28 and three multipliers 30, 32a and 32b.

In this finger, the receive data de-spread circuit 20 de-spreads the receive data (Data Chip) to demodulate. The receive data thus demodulated is supplied to the multiplier 32b. Similarly, the pilot symbol de-spread circuit 22 de-spreads the pilot symbol (PILOT Chip) to demodulate. The demodulated pilot symbol is supplied to the phase calculation circuit 24, the delay circuit 28 and the multiplier 30.

Then the phase calculation circuit 24 performs phase calculation of the demodulated pilot symbol. In other words, the phase calculation circuit 24 calculates the deviation (difference) between the known phase of the pilot symbol and the phase of the pilot symbol actually received. The result of the phase calculation is supplied to the averaging circuit 26 and the multiplier 30. Incidentally, though the result of the phase calculation may be in the form of a phase angle θ, in a case of this embodiment, that is outputted from the phase calculation circuit 24 in the form of COS θ/SIN θ.

The averaging circuit 26 averages the results of phase calculation of the plurality of pilot symbols. The averaged result of the phase calculation is supplied to the multipliers 32a and 32b. Further, while the averaging circuit 26 averages the results of phase calculation of the plurality of pilot symbols as described above, the delay circuit 28 delays the demodulated pilot symbol whereby to adjust timing according to the averaged result of phase calculation. The delayed output signal is supplied to the multiplier 32a.

In the fingers 12a and 12b shown in FIG. 1, the multiplier 30 multiplies the demodulated pilot symbol supplied from the de-spread circuit 22 by the result of phase calculation of the demodulated pilot symbol supplied from the phase calculation circuit 24, so that the instantaneous pilot symbol value ($I_{inst}$, $Q_{inst}$) of the demodulated pilot symbol is calculated. The instantaneous pilot symbol values outputted from the fingers 12a and 12b are both supplied to the weight factor generation circuit 14.

Further, the multiplier 32a multiplies the delay output signal outputted from the delay circuit 28 by the averaged result of phase calculation outputted from the averaging circuit 26 whereby to correct the delay output signal, that is, the phase of the pilot symbol delayed for timing adjustment after the demodulation and the pilot symbol value ($I_{demod}$, $Q_{demod}$) is calculated. Both the pilot symbol values outputted from the fingers 12a and 12b are also supplied to the weight factor generation circuit 14.

Similarly, the multiplier 32b multiplies the demodulated receive data outputted from the de-spread circuit 20 by the averaged result of phase calculation outputted from the averaging circuit 26 whereby to correct the phase of the demodulated receive data. The demodulated receive data which are corrected and outputted from the fingers 12a and 12b are each supplied to the corresponding multipliers 16a and 16b.

Then the weight factor generation circuit 14 in the RAKE combining circuit 10 generates weight factors W0 and W1 for use in giving a weight to the demodulated receive data outputted from each of the fingers 12a and 12b on the basis of the difference between the pilot symbol value and the instantaneous pilot symbol value. The weight factors W0 and W1 are supplied to the respective multipliers 16a and 16b, whereby highly accurate maximum ratio composition can be materialized with a phase error, receiving level deterioration and so forth that have been corrected.

In the RAKE combining circuit 10 shown in FIG. 1, the multipliers 16a, 16b and the adder 18 constitute a combining circuit for combining output signals from the respective fingers 12a and 12b. In this combining circuit, the multipliers 16a and 16b multiply the demodulated receive data from the fingers 12a and 12b by the respective weight factors W0 and W1 outputted from the weight factor generation circuit 14, whereby a weight is given to each receive data. The weighted data are added up and combined by the adder 18 before being outputted as a signal SYMOUT.

The weight factor generation circuit 14 will subsequently be described.

Figure 2:
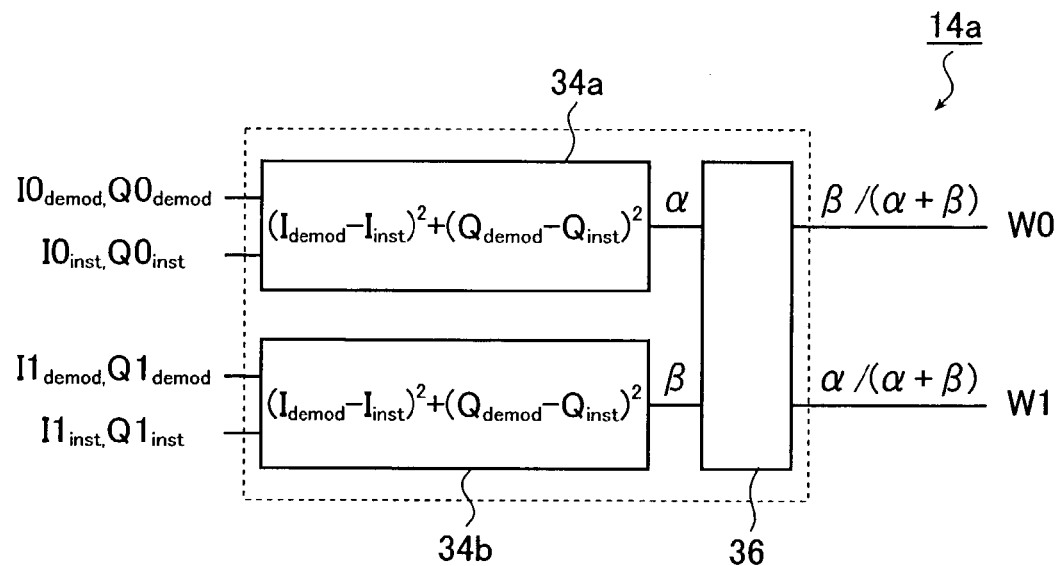
FIG. 2 is a schematic diagram of one embodiment of a weight factor generation circuit.

FIG. 2 is a schematic diagram of one embodiment of the weight factor generation circuit according to the invention. A weight factor generation circuit 14a shown in FIG. 2 has difference generating circuits 34a and 34b arranged corresponding to the respective fingers 12a and 12b, and an inverse ratio generating circuit 36. The weight factor generation circuit 14a calculates a distance in a straight line as the difference between the pilot symbol value and the instantaneous pilot symbol value and then generates weight factors W0 and W1 by calculating the inverse ratio of the distance.

Figure 3:
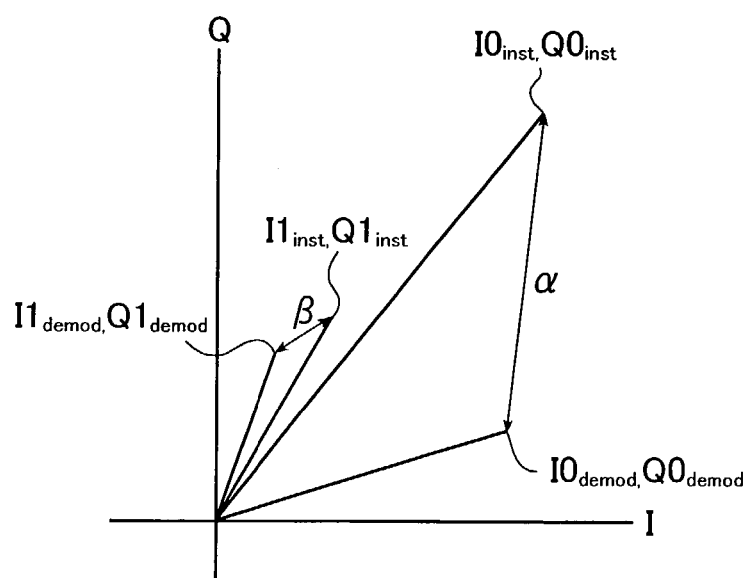
FIG. 3 is a graph of one embodiment showing the relation between a pilot symbol value and an instantaneous pilot symbol value.

Here, as shown by a graph in FIG. 3, the difference generating circuits 34a and 34b calculate the distance in a straight line between the pilot symbol value and the instantaneous pilot symbol value, for example, according to the following equation (1). The results $\alpha$ and $\beta$ of calculation are supplied to the inverse ratio generating circuit 36. With regard to the results $\alpha$ and $\beta$ of calculation, it can be guess that the greater the deviation between the pilot symbol value and the instantaneous pilot symbol value becomes, the lower the reliability becomes, whereas the smaller the deviation becomes, the higher the reliability becomes.

$$\alpha, \beta = (I_{demod} - I_{inst})^2 + (Q_{demod} - Q_{inst})^2 \tag{1}$$

Further, the inverse ratio generating circuit 36 generates weight factors W0 and W1 corresponding to the respective fingers 12a and 12b on the basis of the calculated results $\alpha$ and $\beta$ outputted from the difference generating circuits 34a and 34b. According to this embodiment, the inverse ratio generating circuit 36 calculates the inverse ratio $\beta/(\alpha+\beta)$, $\alpha/(\alpha+\beta)$ of the results $\alpha$ and $\beta$ of calculation using, for example, a functional equation or the like. Thus, it can be done that the weight of the finger having low reliability is decreased, whereas the weight of the finger having high reliability is increased. However, the contents of the functional equation are not restricted in any way.

Figure 4:
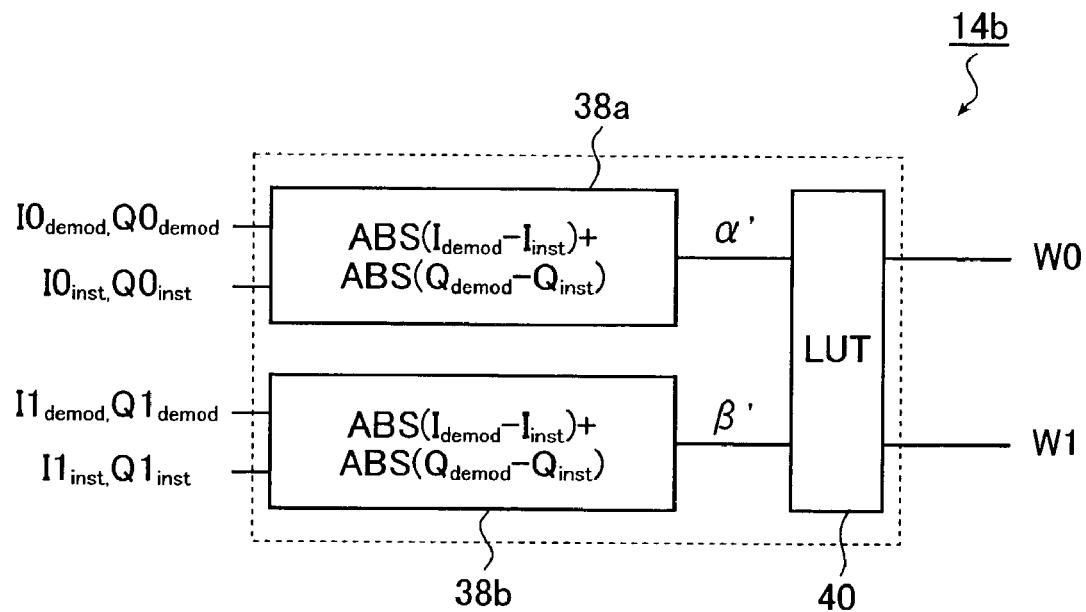
FIG. 4 is a schematic diagram of another embodiment of weight factor generation circuit.

FIG. 4 is a schematic diagram of another embodiment of a weight factor generation circuit. The weight factor generation circuit 14b in FIG. 4 has difference generating circuits 38a and 38b arranged corresponding to the respective fingers 12a and 12b, and a factor conversion circuit 40. The weight factor generation circuit 14b generates weight factors W0 and W1 by calculating the inverse ratio of the Manhattan distance (difference) between the pilot symbol value and the instantaneous pilot symbol value.

Figure 5:
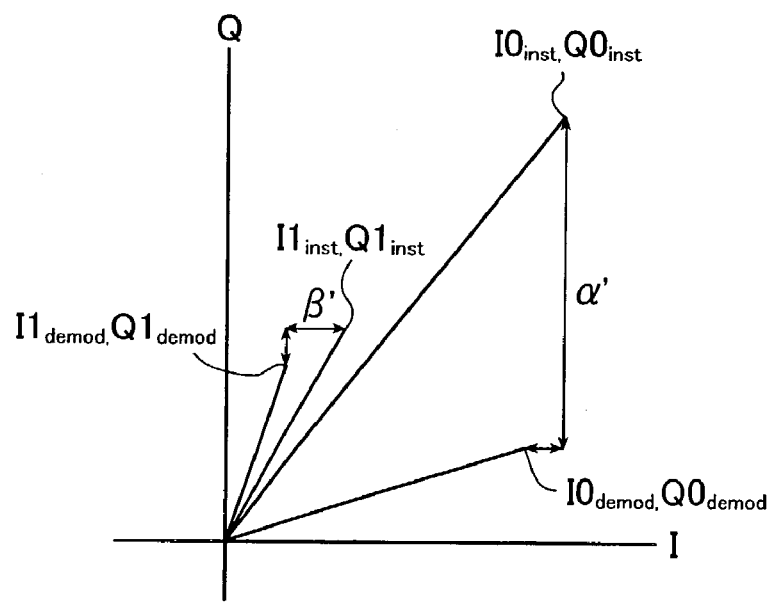
FIG. 5 is a graph of another embodiment showing the relation between a pilot symbol value and an instantaneous pilot symbol value.
Figure 6:
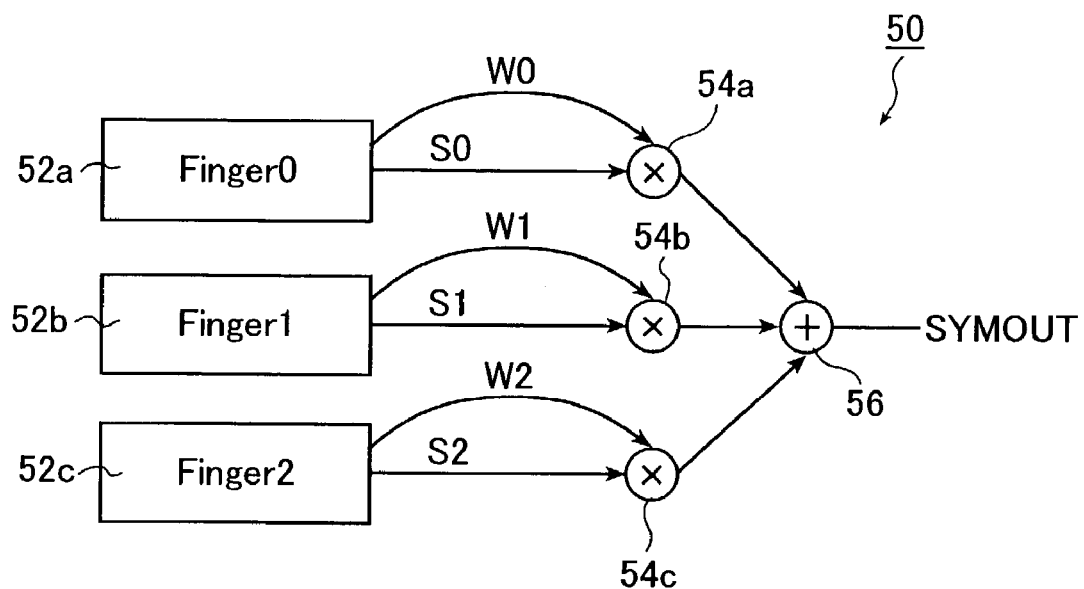
FIG. 6 is a schematic diagram of an example of a conventional RAKE combining circuit.

As shown in a graph of FIG. 5, the difference generating circuits 38a and 38b calculate the Manhattan distance as the difference between the pilot symbol value and the instantaneous pilot symbol value according to the following equation (2), for example. The results $\alpha'$ and $\beta'$ of calculation are supplied to the factor conversion circuit 40. The calculation process can thus be simplified by calculating the Manhattan distance instead of the distance in a straight line and the hardware cost can be reduced.

$$\alpha', \beta' = ABS(I_{demod} - I_{inst}) + ABS(Q_{demod} - Q_{inst}) \tag{2}$$

Further, the factor conversion circuit 40 converts the results $\alpha'$ and $\beta'$ of calculation outputted from the difference generating circuits 38a and 38b into the weight factors W0 and W1 corresponding to the respective fingers 12a and 12b. According to this embodiment, the factor conversion circuit 40 does not calculate the weight factors W0 and W1 using a functional equation or the like but do convert the results $\alpha'$ and $\beta'$ of calculation into weight factors W0 and W1 by using LUT (Look Up Table). However, the contents of the LUT (the weighting method) are not restricted in any way.

In the weight factor generation circuits 14a and 14b, it is possible to change the functional equation and the contents of the LUT at any time as required under control of software used in DSP (Digital Signal Processor) or the like for controlling a circuit operation, for example, by preparing a plurality of functional equations or LUTs, whereby the weighting of each path can be performed in response to the radio wave condition, for example. When the weight factor of a path that has failed to reach a predetermined level is set at 0, for example, no unnecessary calculation is made at the time of RAKE combination in order to save power consumption.

Although two fingers are provided in the RAKE combining circuit 10 shown in FIG. 1, the number of fingers is not limited to this embodiment but may be decided as required. Moreover, though the functional equation and the LUT have been shown by way of example for the inverse ratio generating circuit 36 and the factor conversion circuit 40 in the respective weight factor generation circuits 14a and 14b shown in FIGS. 2 and 4, in reverse, the factor conversion circuit 40 may be employed in the weight factor generation circuit 14a and the inverse ratio generating circuit 36 may also be employed in the weight factor generation circuit 14b.

Although the distance of a straight line and the Manhattan distance have been shown as an example of means for calculating the difference between the pilot symbol value and the instantaneous pilot symbol value according to the above embodiment, the means therefor are not limited to those distances but the difference may be calculated by any other means therefor. A specific circuit structure of the difference generating circuit 34a, 34b, 38a and 38b are not limited in any way but any circuit structure may be employed which is capable of performing the same function.

The RAKE combining circuit and the RAKE combining method according to the invention are basically configured as described above.

Although a detailed description has been given of the RAKE combining circuit and the RAKE combining method according to the invention so far, the invention is not limited to the embodiment thereof but may be modified in various manners without departing from the spirit and scope thereof.

POSSIBILITY OF INDUSTRIAL UTILIZATION

As set forth above in detail, the RAKE combining circuit and the RAKE combining method according to the invention comprising the steps of calculating the instantaneous pilot symbol value and the pilot symbol value, generating the weight factors on the basis of the difference between the instantaneous pilot symbol value and the pilot symbol value and weighting the demodulated receive data outputted from the respective fingers using the weight factors to combine them.

It is thus possible to weight the receive data of the respective paths in consideration of a phase error, receiving level deterioration and so forth and to combine the receive data of the respective paths more accurately.

The invention claimed is:

1. A RAKE combining circuit comprising:
   at least two fingers that are circuits for demodulating pilot symbols as well as receive data and outputting not only an instantaneous pilot symbol value resulting from correcting a phase of one demodulated pilot symbol itself in response to phase deviation of the one demodulated pilot symbol but also a pilot symbol value resulting from correcting a phase of the same pilot symbol corresponding to the instantaneous pilot symbol value in response to averaged phase deviation of a plurality of demodulated pilot symbols,
   a weight factor generation circuit for generating weight factors corresponding to demodulated receive data outputted from the respective fingers on the basis of a difference between the instantaneous pilot symbol value and the pilot symbol value, and
   a combiner for weighting and combining the demodulated receive data outputted from the respective fingers by using the weight factors outputted from the weight factor generation circuit.

2. A RAKE combining circuit as claimed in claim 1, wherein the difference is equivalent to a distance of a straight line or the Manhattan distance, both are distances between the instantaneous pilot symbol value and the pilot symbol value, or a distance calculated by a function with the instantaneous pilot symbol value and the pilot symbol value.

3. A RAKE combining circuit as claimed in claim 1, wherein the weight factor generation circuit generates the weight factor from the difference by using functional equations or LUTs.

4. A RAKE combining circuit as claimed in claim 1, wherein the weight factor is an inverse ratio of the difference.

5. A RAKE combining circuit as claimed in claim 1, each finger comprising:
   a first de-spread circuit for de-spreading the receive data to demodulate the receive data;
   a second de-spread circuit for de-spreading the pilot symbol to demodulate the pilot symbol;
   a phase calculation circuit for performing phase calculation of the demodulated pilot symbol;
   an averaging circuit for averaging the results of phase calculation of the plurality of pilot symbols;
   a delay circuit for delaying the demodulated pilot symbol to adjust timing according to the averaged result of phase calculation while the averaging circuit averages the results of phase calculation of the plurality of the pilot symbols;
   a first multiplier for multiplying the demodulated pilot symbol by the result of phase calculation of the pilot symbol to calculate the instantaneous pilot symbol value of the demodulated pilot symbol;
   a second multiplier for multiplying a delay signal outputted from the delay circuit by the averaged result of phase calculation to calculate the pilot symbol value of the delay output signal;
   and a third multiplier for multiplying the demodulated receive data by the averaged result of phase calculation to calculate the receive data subjected to phase correction.

6. A RAKE combining method comprising the steps of:
   calculating an instantaneous pilot symbol value resulting from correcting a phase of one demodulated pilot symbol in response to phase deviation of the one demodulated pilot symbol and a pilot symbol value resulting from correcting a phase of the same pilot symbol corresponding to the instantaneous pilot symbol value in response to averaged phase deviation of a plurality of demodulated pilot symbols;
   generating a weight factor corresponding to each demodulated receive data on the basis of a difference between the instantaneous pilot symbol value and the pilot symbol value; and
   weighting the respective demodulated receive data to combine the respective data by using the weight factors.

7. A RAKE combining method as claimed in claim 6, wherein the difference is equivalent to a distance of a straight line or the Manhattan distance, both are distances between the instantaneous pilot symbol value and the pilot symbol value, or a distance calculated by a function with the instantaneous pilot symbol value and the pilot symbol value.

8. A RAKE combining method as claimed in claim 6, wherein the weight factor is generated according to the difference by using functional equations or LUTs.

9. A RAKE combining method as claimed inclaim 6, wherein the weight factor is an inverse ratio of the difference.

10. A RAKE combining method as claimed in claim 6, wherein the instantaneous pilot symbol value is calculated through the steps of performing phase calculation of the demodulated pilot symbol and multiplying the demodulated pilot symbol by the result of phase calculation.

11. A RAKE combining method as claimed in claim 6, wherein the pilot symbol value is calculated by multiplying the demodulated pilot symbol which is delayed for time averaging the results of phase calculation of the plurality of pilot symbols by the averaged result of phase calculation.

12. A RAKE combining method as claimed in claim 6, wherein the phase of the demodulated receive data is corrected by multiplying the demodulated receive data by the averaged result of phase calculation.

* * * * *